US00RE48108E

(19) United States
(12) Reissued Patent
Shiraishi et al.

(10) Patent Number: US RE48,108 E
(45) Date of Reissued Patent: Jul. 21, 2020

(54) IMAGE FORMING APPARATUS, IMAGE FORMING METHOD, AND COMPUTER PROGRAM PRODUCT FOR CAUSING A COMPUTER TO EXECUTE THE METHOD

(71) Applicant: RICOH COMPANY, LTD., Tokyo (JP)

(72) Inventors: Emiko Shiraishi, Tokyo (JP); Yasuhiko Ogino, Kanagawa (JP); Reki Nakamura, Kanagawa (JP); Keigo Nakamura, Kanagawa (JP); Takahiro Seki, Kanagawa (JP)

(73) Assignee: RICOH COMPANY, LTD., Tokyo (JP)

(21) Appl. No.: 15/263,064

(22) Filed: Sep. 12, 2016

Related U.S. Patent Documents

Reissue of:
(64) Patent No.: 8,837,969
Issued: Sep. 16, 2014
Appl. No.: 14/068,557
Filed: Oct. 31, 2013

U.S. Applications:
(63) Continuation of application No. 13/042,635, filed on Mar. 8, 2011, now Pat. No. 8,600,247.

(30) Foreign Application Priority Data

Mar. 16, 2010 (JP) ..... 2010-058660

(51) Int. Cl.
*G03G 15/16* (2006.01)
*G03G 13/16* (2006.01)
*G03G 15/00* (2006.01)

(52) U.S. Cl.
CPC ..... *G03G 13/16* (2013.01); *G03G 15/1605* (2013.01); *G03G 15/1675* (2013.01);
(Continued)

(58) Field of Classification Search
CPC ..... G03G 13/16; G03G 15/6594; G03G 15/1605; G03G 15/1675; G03G 2215/00476; G03G 2215/00738
See application file for complete search history.

(56) References Cited

U.S. PATENT DOCUMENTS 5,380,394 A * 1/1995 Shibuya ..... B41J 2/325 156/234
5,926,669 A * 7/1999 Sugimoto ..... G03G 15/1605 399/66

(Continued)

FOREIGN PATENT DOCUMENTS

JP 2002-156839 5/2002
JP 2006-267486 10/2006

(Continued)

OTHER PUBLICATIONS

Matsumoto et al. (JP02006267486A Translation).*
Matsumoto et al. (JP02006267486A Official Translation).*

*Primary Examiner* — Leonardo Andujar
(74) *Attorney, Agent, or Firm* — Oblon, McClelland, Maier & Neustadt, L.L.P.

(57) ABSTRACT

An image forming apparatus includes: an image carrier; a toner image forming unit that forms a toner image on the image carrier; a transfer unit that transfers the toner image on the image carrier to a transfer target having ridges and valleys on a surface thereof; an adjusting unit that adjusts a ratio of A/B, where A is a transfer ratio [%] from the image carrier to a valley portion of the transfer target while B is a transfer ratio [%] from the image carrier to a ridge portion of the transfer target, based on an adjustment input by a user; and a control unit that controls a transfer condition of the transfer unit based on the ratio of A/B adjusted by the adjusting unit.

25 Claims, 5 Drawing Sheets

(52) U.S. Cl.
CPC ..... *G03G 15/6594* (2013.01); *G03G 2215/00476* (2013.01); *G03G 2215/00738* (2013.01)

(56) References Cited

U.S. PATENT DOCUMENTS

| | | | | |
|---|---|---|---|---|
| 6,721,534 | B2 * | 4/2004 | Takahashi | G03G 15/0105 399/344 |
| 7,817,953 | B2 | 10/2010 | Ishibashi et al. | |
| 2007/0014596 | A1 | 1/2007 | Sohmiya et al. | |
| 2007/0178398 | A1 | 8/2007 | Ogino et al. | |
| 2008/0019749 | A1 | 1/2008 | Suzuki | |
| 2008/0102399 | A1 | 5/2008 | Nakamura et al. | |
| 2008/0187857 | A1 | 8/2008 | Ogino et al. | |
| 2008/0223515 | A1 | 9/2008 | Sudo et al. | |
| 2009/0129794 | A1 | 5/2009 | Okamoto et al. | |
| 2009/0324270 | A1 | 12/2009 | Yamashita et al. | |
| 2010/0226697 | A1 | 9/2010 | Ogino | |
| 2013/0164011 | A1 * | 6/2013 | Nakamura et al. | 399/66 |
| 2013/0195483 | A1 * | 8/2013 | Shimizu et al. | 399/45 |

FOREIGN PATENT DOCUMENTS

| | | | |
|---|---|---|---|
| JP | 2006267486 | A * | 10/2006 |
| JP | 4031923 | | 10/2007 |

* cited by examiner

IMAGE FORMING APPARATUS, IMAGE FORMING METHOD, AND COMPUTER PROGRAM PRODUCT FOR CAUSING A COMPUTER TO EXECUTE THE METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 8,837,969 issued Sep. 16, 2014, from U.S. application Ser. No. 14/068,557, which* is a continuation of U.S. application Ser. No. 13/042,635, filed Mar. 8, 2011, *and that issued as U.S. Pat. No. 8,600,247 on Dec. 3, 2013,* and is based upon and claims the benefit of priority from prior Japanese Patent Application No. 2010-058660, filed Mar. 16, 2010, *and* the entire contents of [both of which] *each of the above applications* are incorporated herein by reference.

BACKGROUND OF THE INVENTION

1. Field of the Invention

The present invention relates to an electrophotography image forming apparatus, such as a copying machine, a facsimile, and a printer; an image forming method used therein; and a computer program product for causing a computer to execute the method.

2. Description of the Related Art

Electrophotography image forming apparatuses have been widely used in high speed mass printing field typified by newspapers, posters, books, and direct mail with recent progress in high speed operation and colorization technology for the apparatuses. In such field, various kinds of printing media are used. There are increasing demands for printing on a transfer target having low surface smoothness such as embossed paper. However, when the electrophotography image forming apparatuses are used for such medium, a problem arises in that toner is not sufficiently transferred to a valley portion compared with a ridge portion of a transfer target; because a transfer electric field at the valley portion is smaller than that at the ridge portion. As a result, white spots occur in an image formed on a transfer target having low surface smoothness. In order to address this problem, image forming apparatuses employing transfer methods for solving the problem have been proposed. Refer to Japanese Patent Application Laid-open No. 2002-156839, Japanese Patent Application Laid-open No. 2002-202638, and Japanese Patent Application Laid-open No. 2006-267486. For example, Japanese Patent Application Laid-open No. 2006-267486 discloses an image forming apparatus employing a transfer method in which an alternating voltage is superimposed on transfer bias. In the image forming apparatus, the superimposing of the alternating voltage on the transfer bias causes toner to be reciprocated between an image carrier and a transfer target so as to increase frequency of toner contacting with a valley portion of a recording medium, thereby reducing failures of toner transfer to a valley portion on a surface of the recording medium. This image forming apparatus is suitable for printing characters on rough surface paper, such as in a case of newspaper printing, because the reduction of failures of toner transfer to a valley portion enhances character visibility.

In most cases where embossed paper having ridges and valleys that are intentionally provided to give premium accents is used as a transfer target, images having higher design property rather than characters are printed. In such cases, printing that utilizes texture of the transfer target is desired. For example, when texture of an image drawn with colored pencils or printed by block print is desired, a toner adhesion amount on a valley portion is reduced; while when texture of an image drawn with paints is desired, a toner adhesion amount on a valley portion is set to be larger than that on a ridge portion. In this way, various kinds of texture can be made by intentionally differentiating the toner adhesion amounts between ridge and valley portions. The prior art image forming apparatuses, however, cannot adjust the toner adhesion amount between ridge and valley portions. As a result, a problem arises in that texture of a transfer target is lost and not utilized.

SUMMARY OF THE INVENTION

It is an object of the present invention to at least partially solve the problems in the conventional technology.

According to an aspect of the present invention, there is provided an image forming apparatus, including: an image carrier; a toner image forming unit that forms a toner image on the image carrier; a transfer unit that transfers the toner image on the image carrier to a transfer target having ridges and valleys on a surface thereof; an adjusting unit that adjusts a ratio of A/B, where A is a transfer ratio [%] from the image carrier to a valley portion of the transfer target while B is a transfer ratio [%] from the image carrier to a ridge portion of the transfer target, based on an adjustment input by a user; and a control unit that controls a transfer condition of the transfer unit based on the ratio of A/B adjusted by the adjusting unit.

According to another aspect of the present invention, there is provided an image forming method for an image forming apparatus that includes: an image carrier; a toner image forming unit that forms a toner image on the image carrier; and a transfer unit that transfers the toner image on the image carrier to a transfer target having ridges and valleys on a surface thereof, the method including: adjusting a ratio of A/B, where A is a transfer ratio [%] from the image carrier to a valley portion of the transfer target while B is a transfer ratio [%] from the image carrier to a ridge portion of the transfer target, based on an adjustment input by a user by an adjusting unit; and controlling a transfer condition of the transfer unit based on the ratio of A/B adjusted at the adjusting by a controlling unit.

According to still another aspect of the present invention, there is provided a computer program product including a non-transitory computer-usable medium having computer-readable program codes embodied in the medium for image forming in an image forming apparatus that includes: an image carrier; a toner image forming unit that forms a toner image on the image carrier; and a transfer unit that transfers the toner image on the image carrier to a transfer target having ridges and valleys on a surface thereof, the program codes when executed causing a computer to execute: adjusting a ratio of A/B, where A is a transfer ratio [%] from the image carrier to a valley portion of the transfer target while B is a transfer ratio [%] from the image carrier to a ridge portion of the transfer target, based on an adjustment input by a user by an adjusting unit; and controlling a transfer condition of the transfer unit based on the ratio of A/B adjusted at the adjusting by a controlling unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
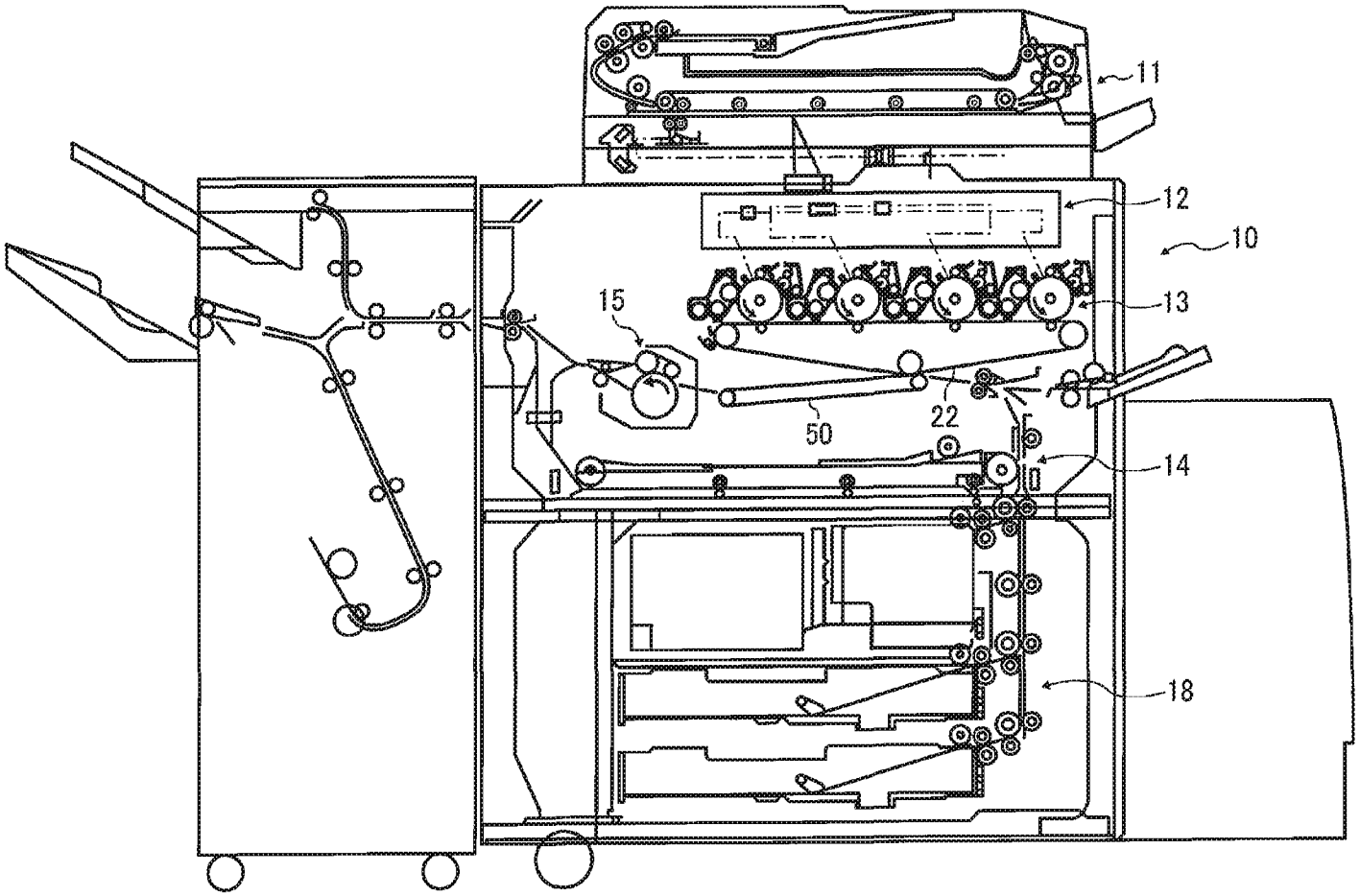
FIG. 1 is a schematic illustrating an overall structure of an image forming apparatus according to an embodiment.
Figure 2:
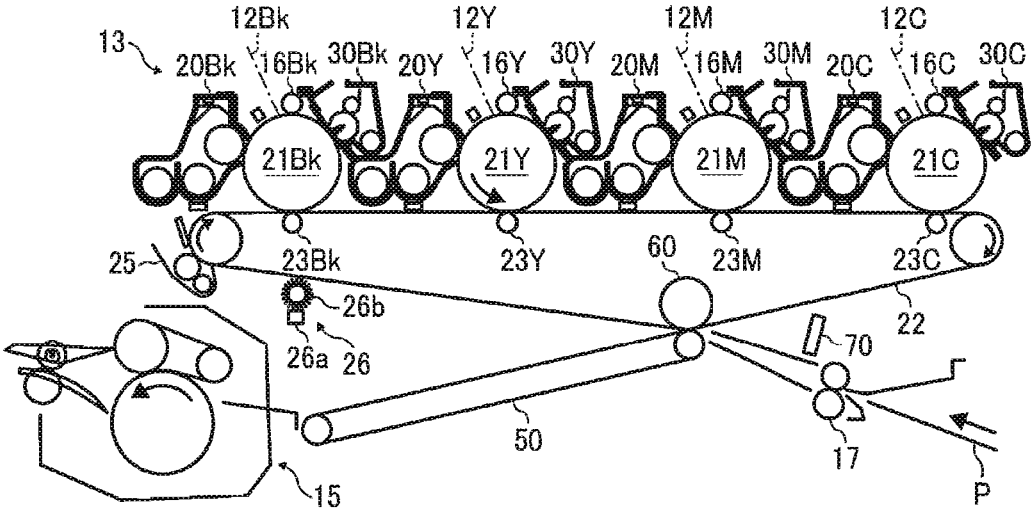
FIG. 2 is a schematic illustrating a structure of an image forming section of the image forming apparatus.

An embodiment is described below in which the present invention is applied to an image forming apparatus 10 that employs electrophotography and is capable of forming color images. FIG. 1 is a schematic illustrating an overall structure of the image forming apparatus 10 according to the embodiment. The image forming apparatus 10 includes an image scanning section 11, an image writing section 12, an image forming section 13, and a paper feeding unit 14, for forming color images by electrophotography. FIG. 2 is a schematic illustrating a structure of only the image forming section 13 of the image forming apparatus 10.

The schematic structure and operation of the image forming 10 is described below. In FIGS. 1 and 2, an image signal is produced based on image data of an original image scanned by the image scanning section 11 or image data sent from a host computer serving as an external information processing apparatus (a user terminal apparatus). The produced image signal is converted into color signals of yellow (Y), magenta (M), cyan (C), and black (Bk) for image forming, and the color signals are transmitted to the image writing section 12. The image writing section 12 is structured with a laser scanning optical system including a laser light source, a deflector such as a rotating polygon mirror, a scanning imaging optical system, and a mirror group, as exemplarily illustrated in FIG. 1. The image writing section 12 may he structured with a light emitting diode (LED) writing system composed of an LED array in which a plurality of LEDs serving as optical elements are arrayed in a one-dimension or a two-dimension, and an imaging optical system. The image writing section 12 further includes four writing optical paths 12Y, 12M, 12C, and 12Bk each corresponding to one of the color signals. As illustrated in FIG. 2, the image writing section 12 writes images corresponding to the color signals into respective photosensitive elements 21Y, 21M, 21C, and 21Bk serving as image carriers each included in one of four image forming units provided to the image forming section 13, through the respective writing optical paths 12Y, 12M, 12C, and 12Bk.

Figure 3:
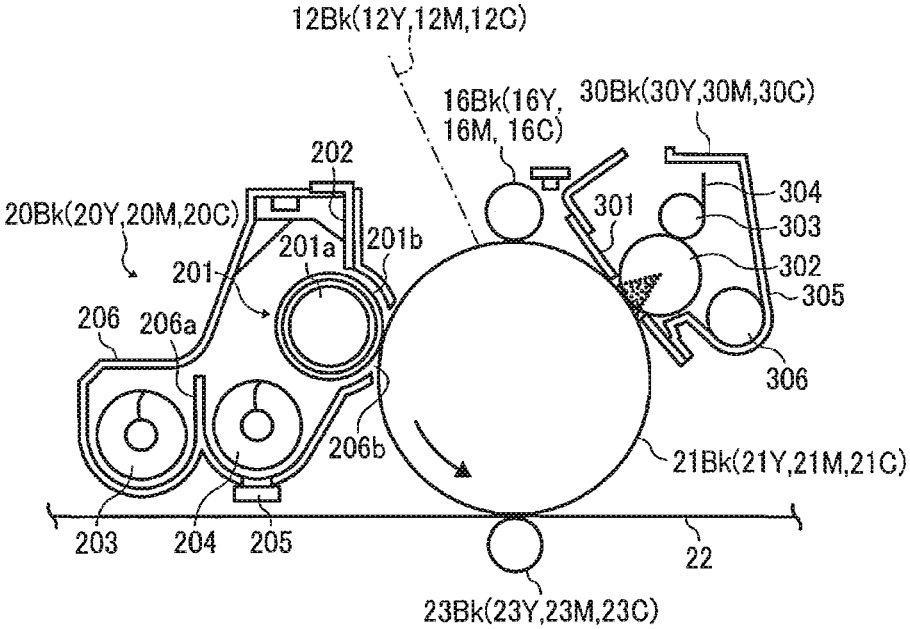
FIG. 3 is a schematic to describe more detail structures of the image forming units for respective colors of the image forming section.

FIG. 3 is a schematic to describe more detailed structures of the image forming units for the respective colors of the image forming section 13. Generally, an organic photoconductor (OPC) photosensitive element is used for the photosensitive elements 21Y for yellow (Y), 21M for magenta (M), 21C for cyan (C), and 21Bk for black (Bk), each included in the respective image forming units provided in the image forming section 13. As illustrated in FIGS. 2 and 3, a charging unit, an exposing unit using a laser beam from the image writing section 12, a developing unit, a primary transfer bias roller serving as a primary transfer unit, and a cleaning device are disposed around each of the photosensitive elements 21Y, 21M, 21C, and 21Bk. The charging units for the four photosensitive elements are charging units 16Y, 16M, 16C, and 16Bk. The developing units for the four photosensitive elements are developing units 20Y, 20M, 20C, and 20Bk. The primary transfer bias rollers for the four photosensitive elements are primary transfer bias rollers 23Y, 23M, 23C, and 23Bk. The cleaning devices for the four photosensitive elements are cleaning devices 30Y, 30M, 30C, and 30Bk.

In the embodiment, a developing unit employing a two-component magnetic brush developing method is used for each of the developing units 20Y, 20M, 20C, and 20Bk. However, other developing units employing other methods may be used. An intermediate transfer belt 22 that serves as an intermediate transfer body and an image carrier is provided so as to extend between each of the photosensitive elements 21Y, 21M, 21C, and 21Bk and corresponding one of the primary transfer bias rollers 23Y, 23M, 23C, and 23Bk. Each color toner image formed on the respective photosensitive elements is sequentially transferred onto the intermediate transfer belt 22 so as to overlap with each other.

A sheet (transfer sheet) P serving as a transfer target is fed from the paper feeding unit 14 or a paper feeding bank 18 (refer to FIG. 1) of the image forming apparatus 10. Thereafter, the sheet P is fed via a pair of registration rollers 17 illustrated in FIG. 2, and then is carried by a transfer conveying belt 50 serving as a transfer conveying member. The toner images transferred on the intermediate transfer belt 22 are secondarily transferred (collective transfer) on the sheet P with a secondary transfer bias roller 60 serving as a secondary transfer unit at a point where the intermediate transfer belt 22 and the transfer conveying belt 50 are made contact with each other. As a result, a color image is formed on the sheet P. Secondary transfer bias having a predetermined transfer voltage is applied to the secondary transfer bias roller 60 from a secondary transfer bias power source (not illustrated) serving as a transfer bias application unit. In the embodiment, secondary transfer bias is applied that has a transfer voltage in which an alternating voltage is superimposed on a direct-current voltage.

The sheet P having the color image formed thereon is conveyed on the transfer conveying belt 50 to a fixing unit 15. The image transferred on the sheet P is fixed by the fixing unit 15, and thereafter the sheet P is externally discharged from the main body of the image forming apparatus.

Toner that has not been transferred onto the sheet P in the secondary transfer and remains on the intermediate transfer belt 22 is removed from the intermediate transfer belt 22 by a belt cleaning device 25 serving as an intermediate transfer body cleaning unit. A lubricant coating device 26 is disposed downstream from the belt cleaning device 25. The lubricant coating device 26 includes solid lubricant 26a, a conductive brush 26b that coats the solid lubricant 26a on the intermediate transfer belt 22 by sliding on the intermediate transfer belt 22. The conductive brush 26b constantly makes contact with the intermediate transfer belt 22 so as to coat the solid lubricant 26a onto the intermediate transfer belt 22. The solid lubricant 26a acts to enhance cleaning property of the intermediate transfer belt 22 so as to prevent an occurrence of toner filming, thereby increasing durability of the intermediate transfer belt 22.

Each surface of the photosensitive elements 21Y, 21M, 21C, and 21Bk is charged with a predetermined potential (e.g., about −700 V) by the respective charging units 16Y, 16M, 16C, and 16Bk each disposed upstream of the respective writing optical paths 12Y, 12M, 12C, and 12Bk, before image writing. In the embodiment, the charging units 16Y, 16M, 16C, and 16Bk use a conductive rubber roller. Each conductive rubber roller of the charging units 16Y, 16M, 16C, and 16Bk is disposed so as not to make contact with and charge the respective photosensitive elements 21Y, 21M, 21C, and 21Bk with a distance of about 50 μm from the photosensitive element. In addition, an alternating-current voltage having predetermined frequency and peak-to-peak voltage (e.g., a frequency of about 1 kHz, and a peak-to-peak voltage of 2 kV) is applied to each conductive rubber roller. The center value of the alternating-current voltage is set to a predetermined potential (e.g., about −800 V). Accordingly, each surface of the photosensitive elements 21Y, 21M, 21C, and 21Bk is uniformly charged with a predetermined potential (e.g., about −700 V).

The charging means that charges each surface of the photosensitive elements 21Y, 21M, 21C, and 21Bk is not limited to the non-contact charging employed by the charging units as described above, but the following methods also can be used: contact charging in which the conductive rubber roller is disposed so as to make contact with and charge each of the photosensitive elements 21Y, 21M, 21C, and 21Bk; a combination of alternating-current (AC) charging and direct-current (DC) charging; DC bias roller charging in which each of the photosensitive elements is charged with DC bias of about −1400 V without applying AC bias; conventionally well-used corona charging using a corotron or scorotron system; and conventionally well-used brush charging.

After each surface of the photosensitive elements 21Y, 21M, 21C, and 21Bk is charged, the image writing section 12 writes images on each surface of the photosensitive elements 21Y, 21M, 21C, and 21Bk. As a result, static latent images each corresponding to one of color images of yellow, magenta, cyan, and black are respectively formed on the surfaces of the photosensitive elements 21Y for yellow, 21M for magenta, 21C for cyan, and 21Bk for black. These static latent images are developed by the developing units 20Y for yellow, 20M for magenta, 20C for cyan, and 20Bk for black.

As illustrated in FIG. 3, each of the developing units 20Y, 20M, 20C, and 20Bk includes a developing roller 201 serving as a developer carrier, a doctor blade 202 serving as a developer amount regulating member, two screws 203 and 204 serving as a developer agitation carriage unit, a toner density sensor 205 serving as a toner density detection unit, and a development case 206. The screws 203 and 204 are disposed so as to be positioned in diagonally lower direction from the developing roller 201. The two screws 203 and 204 are disposed in a horizontal direction in parallel with each other. The development case 206 has a partition 206a that partitions the development case 206 into two chambers so as to separate the two screws 203 and 204 from each other. The partition 206a has two cutouts, one at the front side and the other at the rear side in FIG. 3, so that developer in each chamber of the development case 206 is circulated and carried by the two screws 203 and 204.

The development case 206 has an opening portion 206b formed at a part facing the photosensitive element so as to expose part of the developing roller 201 out of the opening portion 206b. In addition, the developing roller 201, the screws 203 and 204, and the doctor blade 202 are disposed as illustrated in FIG. 3 so as to provide a relatively slightly large space above the screw 204 inside the development case 206. The development cases 206 of the developing units 20Y, 20M, 20C, and 20Bk respectively house developer of colors of yellow, magenta, cyan, and black for developing static latent images each corresponding to one of color images. In the embodiment, two-component developer in which non-magnetic toner and magnetic carriers are dispersed and mixed is used as the developer.

Each developer of the developing units 20Y, 20M, 20C, and 20Bk is agitated and carried by the two screws 203 and 204 rotating in the opposite direction from each other, so that the developer constantly circulates in each chamber of the development case 206 by passing through the cutouts provided at the front and rear sides of the partition 206a. The developer is supplied toward the developing roller 201 by a screw 204 that circulates, agitates, and carries the developer. The developing roller 201 is composed of a magnetic roller 201a serving as a magnetic field generation unit and a developing sleeve 201b that is nonmagnetic and rotatably mounted on the magnetic roller 201a so as to cover the outer circumference of the magnetic roller 201a.

The developer supplied to the developing roller 201 is carried on a surface of the developing sleeve 201b by a magnetic force of the magnetic roller 201a and the rotation of the developing sleeve 201b so as to be held in a magnetic brush-like shape. The developer held in the magnetic brush-like shape on the surface of the developing sleeve 201b is carried toward the opening portion 206b of the development case 206 while co-rotating with the rotation of the developing sleeve 201b. The developer is cut by the doctor blade 202 with a fixed length so as to be measured with a proper amount before entering the opening portion 206b. Thereafter, the developer is moved into a developing region formed between the surface of the developing roller 201 exposed out of the opening portion 206b and the surface of the photosensitive element.

The developer cut off by the doctor blade 202 does not move into the developing region, but moves along the outer circumference of the developer held in a magnetic brush-like shape on the surface of the developing sleeve 201b and drops onto the screw 204 by own weight so as to return to a circulation carriage path of the development case 206. The developer returned to the circulation carriage path is agitated and carried again by the two screws 203 and 204, and thereafter supplied to the developing roller 201 again by the screw 204.

On the other hand, the developer having moved into the developing region forms a toner image on the photosensitive element by transferring toner on a static latent image formed on the photosensitive element so as to visualize the static latent image. Developing bias is applied on the developing sleeve 201b with a predetermined voltage (e.g., −500 V). A potential difference between a photosensitive element potential (e.g., about −150 V) that is an potential of an exposure region on the photosensitive element and the developing bias causes toner in the developer held on the developing sleeve 201b to transfer on the static latent image formed on the photosensitive element.

Excessive developer including toner and carriers that have not been consumed in visualizing the static latent image is moved so as to be returned inside the development case 206 while being held on the developing sleeve 201b. The excessive developer leaves from the developing sleeve 201b and drops onto the screw 204 by own weight when the developer is moved into an area on which a magnetic force of the magnetic roller 201a doses not act of the surface of the developing sleeve 201b. As a result, the excessive developer is collected into the circulation carriage path of the development case 206. The collected excessive developer is then agitated and carried again by the two screws 203 and 204, and thereafter supplied to the developing roller 201 again by the screw 204.

As described above, the developer is repeatedly supplied to and collected from the developing sleeve 201b while circulating inside the development case 206 by being agitated and carried by the two screws 203 and 204. As toner in developer is consumed by repeatedly carrying out developing processing for visualizing static latent images on the photosensitive element, a toner density in developer housed in the development case 206 gradually lowers. In each of the developing units 20Y, 20M, 20C, and 20Bk, the toner density sensor 205 detects a toner density of developer housed in the development case 206. Based on a detection result of the toner density sensor 205, a toner replenishing unit (not illustrated) timely replenishes new supplemental toner in the development case 206 so as to constantly maintain a toner density of developer in the development case 206 at a fixed toner density.

The color toner images formed on the photosensitive elements 21Y, 21M, 21C, and 21Bk are primarily transferred and sequentially, color by color, overlapped on a surface of an intermediate transfer belt 22 that rotates while making contact with the surfaces of the photosensitive elements, by the primary transfer bias rollers 23Y, 23M, 23C, and 23Bk disposed so as to be opposite to the photosensitive elements 21Y, 21M, 21C, and 21Bk, respectively. In other word, the primary transfer bias rollers 23Y, 23M, 23C, and 23Bk, which are disposed to face the respective photosensitive elements with the intermediate transfer belt 22 interposed therebetween, cause a transfer electric field to be generated in a primary transfer region between the intermediate transfer belt 22 and the photosensitive elements having a predetermined photosensitive element potential on their surfaces (e.g., about −150 V). The toner images on the photosensitive elements are statistically transferred on the intermediate transfer belt 22 with the transfer electric field.

A conductive sponge roller is generally used as the primary transfer bias rollers 23Y, 23M, 23C, and 23Bk. There are two methods to provide conductivity to the roller: one is a method in which an ion conductive agent is mixed into rubber material, and the other one is a method in which an electron conductive agent such as carbon is mixed into rubber material. A roller using an electron conductive agent, however, generally has markedly uneven resistivity. Thus, the roller is unsuitable for good transfer. Therefore, in the embodiment, the primary transfer bias roller is made of ion conductive foamed nitrile butadiene rubber (NBR) having a hardness of Asker C 40 degrees and a resistance value of $10^7\Omega$. Transfer bias is applied to the primary transfer roller so as to generate a transfer electric field.

Various kinds of material can be used for the intermediate transfer belt 22. The following belts are preferably used: a belt made of polyimide having excellent durability and high Young's modulus; a belt made of polyvinylidene fluoride (PVDF) having excellent surface smoothness; and a multi-layered belt composed of a polyurethane resin layer, a polyurethane rubber layer formed on the polyurethane resin layer, and a coating layer that contains fluorine components, and is formed on the polyurethane rubber layer so as to serve as an elastic surface layer. The manufacturing method and material of the intermediate transfer belt are not limited to any specific ones. In the embodiment, a polyimide resin was used as the material because the resin is most suitable from a strength point of view. The belt made of the polyimide resin had a surface resistivity of $1\times10^{11}\Omega/\square$ and a volume resistivity of $1\times10^9$ Ωcm.

The polyimide intermediate transfer belt was formed by a general method as follows: a polymer solution including carbon black dispersed therein was injected into a cylindrical metal mold; and an endless film was formed by centrifugal molding, i.e., the cylindrical metal mold was rotated while being heated at 100 to 200° C. The film thus formed was removed from the mold with a semi-hardened state, and overlaid on an iron spindle so as to be hardened by progressing the imidization reaction at 300 to 450° C. As a result, the intermediate transfer belt was made. In this process, characteristics of the belt can be controlled by changing a carbon amount, a firing temperature, and a hardening speed, for example. This method also can control the volume resistivity and the surface resistivity. The volume resistivity and the surface resistivity were measured with High Rester-UP (MCP-HT450) high resistance meter and URS probe (MCP-HTP14) both of which are manufactured by Mitsubishi Chemical Co., Ltd.

As described above, each color toner image formed on the photosensitive elements 21Y, 21M, 21C, and 21Bk is sequentially overlapped on the surface of the intermediate transfer belt 22 by primary transfer, whereby a full-color toner image composed of four color toner images is formed on the intermediate transfer belt 22. The full-color toner image formed on the intermediate transfer belt 22 is secondarily transferred (collective transfer) on the sheet P carried by the transfer conveying belt 50 after being fed by the registration roller 17, by the secondary transfer bias roller 60 to which predetermined secondary transfer bias is applied. User adjustment on a secondary transfer condition (secondary transfer bias application condition) is described later in detail.

The sheet P on which the full-color image has been formed by the secondary transfer is carried to the fixing unit 15 by the transfer conveying belt 50. The secondarily transferred full-color image is fixed by the fixing unit 15, and thereafter the sheet P is externally discharged out from the main body of the image forming apparatus. Remaining toner that remains on the intermediate transfer belt 22 after the secondary transfer is removed from the intermediate transfer belt 22 by the belt cleaning device 25. Then, a subsequent image is formed by the image forming units for the respective colors of the image forming section 13.

Toner remaining on each of the photosensitive elements 21Y, 21M, 21C, and 21Bk after the primary transfer is removed by the respective cleaning devices 30Y, 30M, 30C, and 30Bk as the following manner. As illustrated in FIG. 3, the cleaning device of the embodiment employs a combine use of a cleaning blade 301 that serves as a cleaning member and is made of a polyurethane rubber having elasticity, and a fur brush 302 having conductivity. An electric field roller 303 made of metal is disposed so as to make contact with the fur brush 302. A scraper 304 is disposed so as to make contact with the electric field roller 303.

In FIG. 3, toner remaining on each of the photosensitive elements 21Y, 21M, 21C, and 21Bk is scraped and dropped off from the photosensitive element by the fur brush 302 rotating in an opposite direction (a counter direction) from the rotating direction of the photosensitive element. Toner stuck to the fur brush 302 is removed by the electric field roller 303 rotating in the opposite direction from the rotating direction of the fur brush 302 and sticks to the electric field roller 303. The toner stuck to the electric field roller 303 is scraped by the scraper 304 and drops into a cleaning case 305 for being collected therein. Cleaning bias is applied to the electric field roller 303. Remaining toner on the photosensitive element is moved from the fur brush 302 to the electric field roller 303 by a static electric force caused by the cleaning bias, and thereafter is scraped off from the electric field roller 303 by the scraper 304.

The toner thus collected in the cleaning case 305 is moved by a collecting screw 306 to a waste toner bottle (not illustrated) or the developing unit of the image forming unit provided with the cleaning device. In a printer of the embodiment, toner collected from the cleaning case 305 by the collecting screw 306 is returned to the corresponding developing unit so as to reuse it.

Each cleaning device of the image forming units is disposed in such a manner that a part where the collecting screw 306 in one certain cleaning device is provided to overlap a part of the development case 206 located above the screw 203 of the developing unit of the image forming unit that is adjacent downstream to the one certain cleaning device, as illustrated in FIG. 2. This arrangement enables the image forming units to be closely disposed with each other, and the main body of the image forming apparatus to be reduced in size.

User adjustment on the secondary transfer condition of the image forming apparatus having the structure described above is described below.

First, the description is made when no detection unit that detects surface smoothness of the sheet P as a transfer target is provided.

Figure 4:
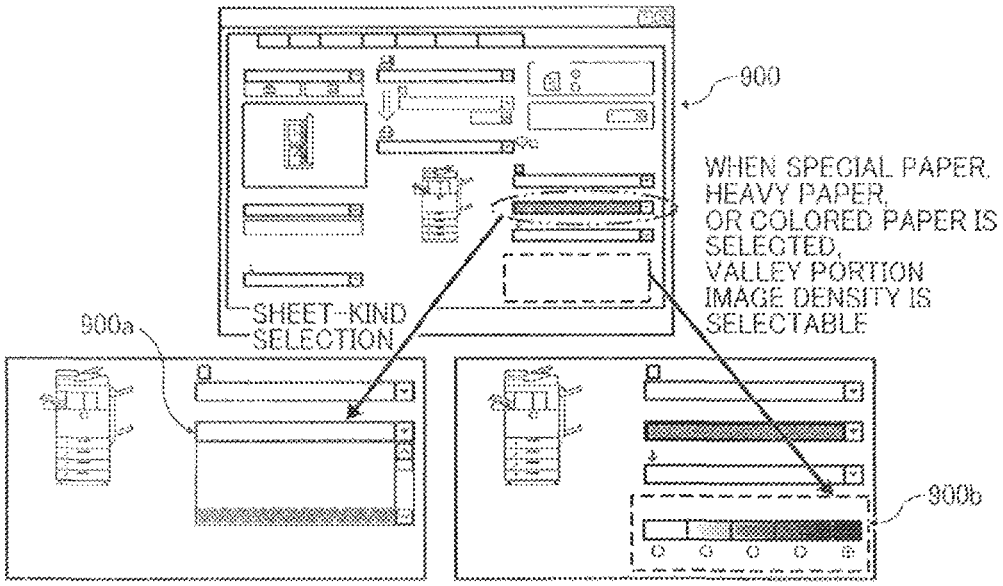
FIG. 4 is an explanatory view illustrating an example of a basic setting screen of a print setting screen of the image forming apparatus.

FIG. 4 illustrates an example of a basic setting screen of a print setting screen used when an image forming condition is set for the image forming apparatus 10 of the embodiment. This print setting screen is displayed on a display section (e.g., a liquid crystal display) provided on an operation panel of the image forming apparatus 10, or a display section (e.g., a liquid crystal display) of a host computer that serves as an external information processing apparatus (a user terminal apparatus) and in which a printer driver compatible with the image forming apparatus 10 is installed.

In a basic setting screen 900 of the print setting screen illustrated in FIG. 4, a density selection section 900b is displayed only when "heavy paper" having ridges and valleys on its surface, "colored paper", or "special paper" is selected from a sheet-kind selection column in a sheet-kind selection section 900a. The density selection section 900b is for selecting a "valley portion image density/ridge portion image density". In the density selection section 900b, the "valley portion image density" corresponds to a transfer rate A [%] from the intermediate transfer belt 22 to a valley portion of the sheet P while the "ridge portion image density" corresponds to a transfer rate B [%] from the intermediate transfer belt 22 to a ridge portion of the sheet P. The "valley portion image density/ridge portion image density" corresponds to a ratio of A/B. In a five-level grayscale display extending in the traverse direction of the density selection section 900b, the valley portion image density is relatively lower than the ridge portion image density in a light area located on the left side; and as the area closes to the right side, the valley portion image density becomes relatively higher than the ridge portion image density.

A user can select and set any one of the five levels indicating the "valley portion image density/ridge portion image density" in the density selection section 900b by operating the operation panel serving as an adjusting unit of the image forming apparatus 10, or operating an operation section (e.g., a keyboard or a mouse) serving as the adjusting unit of the host computer. Based on the selection result of the "valley portion image density/ridge portion image density", a control unit controls a condition of secondary transfer bias applied to the secondary transfer bias roller 60. As for the control unit, for example, a main control section in a control system included in the image forming apparatus 10 can be used. The main control section includes a CPU and memories.

The relations between the five levels of the "valley portion image density/ridge portion image density" (ratio of A/B) that a user can select and set, and the secondary transfer condition are exemplarily listed as follows.

(1) When a user sets the "valley portion image density/ridge portion image density" to the lowest ratio, secondary transfer bias having a direct-current component (hereinafter referred to as a "DC component") that is set to −3000 V, and an alternating-current component (hereinafter referred to as a "AC component") whose amplitude is set to 0 V is applied to the secondary transfer bias roller 60. In other words, the secondary transfer bias is a direct-current voltage. This bias application condition is the same as that in normal image forming.

(2) When a user sets the "valley portion image density/ridge portion image density" to the second lowest ratio, secondary transfer bias having the DC component that is set to −600 V, and the AC component with a sine wave having a frequency of 1 kHz whose amplitude is set to 2000 V is applied to the secondary transfer bias roller 60.

(3) When a user sets the "valley portion image density/ridge portion image density" to the third lowest ratio, secondary transfer bias having the DC component that is set to −300 V, and the AC component with a sine wave having a frequency of 1 kHz whose amplitude is set to 4000 V is applied to the secondary transfer bias roller 60.

(4) When a user sets the "valley portion image density/ridge portion image density" to the fourth lowest ratio, secondary transfer bias having the DC component that is set to −100 V, and the AC component with a sine wave having a frequency of 1 kHz whose amplitude is set to 4000 V is applied to the secondary transfer bias roller 60.

(5) When a user sets the "valley portion image density/ridge portion image density" to the highest ratio, secondary transfer bias having the DC component that is set to 0 V, and the AC component with a sine wave having a frequency of 1 kHz whose amplitude is set to 4000 V is applied to the secondary transfer bias roller 60.

Figure 5:
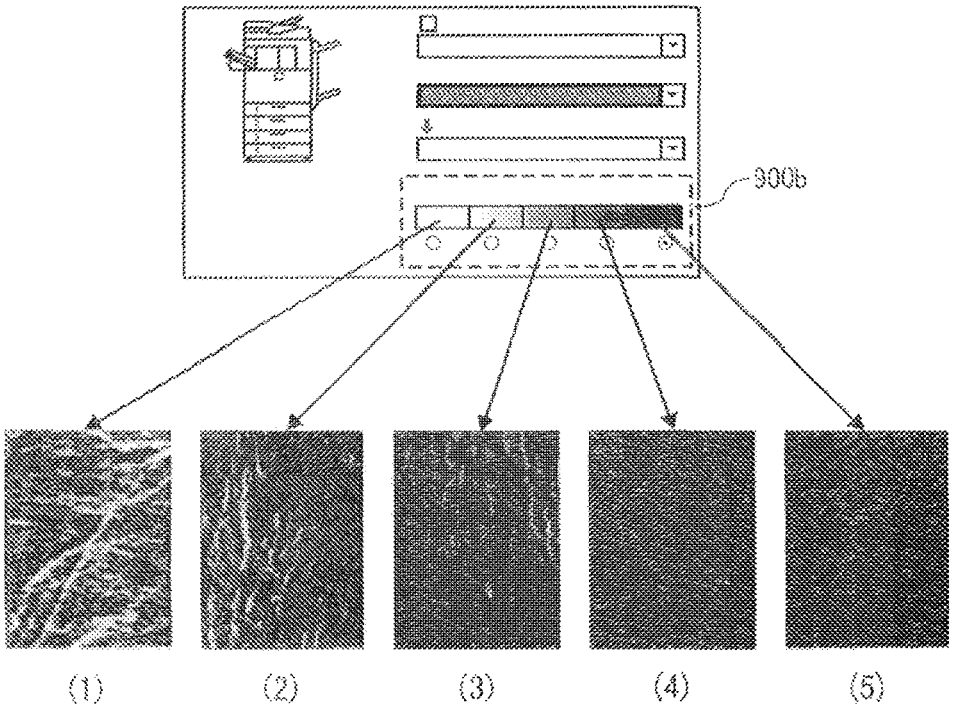
FIG. 5 is an explanatory view illustrating a result when a solid image is printed on Leathac paper by controlling a condition of secondary transfer bias applied to a secondary transfer bias roller.

FIG. 5 illustrates the results in which a solid image is printed onto Leathac paper by controlling the secondary transfer bias application condition to the secondary transfer bias roller 60 in each of the five levels (1) to (5) described above. Each of the five levels (1) to (5) in FIG. 5, a magnitude relation between the transfer rate A for valley portions and the transfer rate B for ridge portions can be estimated as follows. The term "transfer rate" is defined as follows: a toner adhesion amount on a sheet after transfer

[mg/cm$^2$]÷a toner adhesion amount on the intermediate transfer belt 22 before transfer [mg/cm$^2$]. Accordingly, the magnitude relation between the transfer rates A and B is determined by "a relation between a toner adhesion amount on a valley portion of a sheet" and "a toner adhesion amount on a ridge portion of the sheet", when "the toner adhesion amount before transfer" is constant regardless of locations on a sheet such as a case of the printed solid image illustrated in FIG. 5. As for a sheet, such as a white sheet, having higher luminance than that of toner on its exposed surface, it is known that a toner adhesion amount on the sheet monotonically decreases with respect to luminance of a toner image imaged by a charge coupled device (CCD) camera serving as an image capturing unit. Consequently, the following relations can be determined: when luminance of a toner image is higher in a ridge portion than that in a valley portion, A/B>1; when luminance of a toner image is lower in the ridge portion than that in the valley portion, A/B<1; and when luminance of a toner image in the ridge portion equals to that in the valley portion, A/B=1.

In contrast, a toner adhesion amount monotonically increases with respect to luminance of a toner image imaged by a CCD camera in a case of a sheet having lower luminance than that of toner on its exposed surface. Consequently, in this case, the following relations can be determined: when luminance of a toner image is higher in a ridge portion than that in a valley portion, A/B<1; when luminance of a toner image is lower in the ridge portion than that in the valley portion, A/B>1; and when luminance of a toner image in the ridge portion equals to that in the valley portion, A/B=1.

Figure 6:
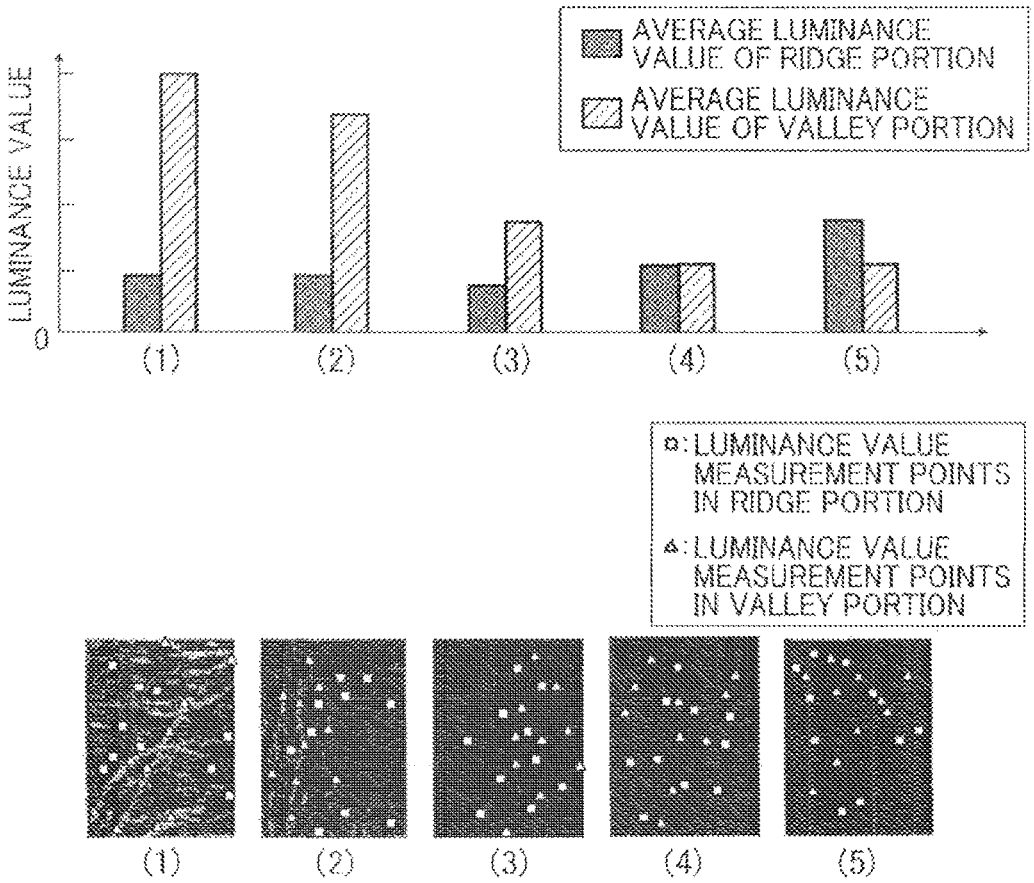
FIG. 6 is a graph illustrating luminance values measured on a valley portion and a ridge portion of an image printed on a white sheet in each of five levels of FIG. 5.

FIG. 6 is a graph illustrating the results in which luminance is measured on valley and ridge portions of an image printed on a white sheet in each of the five levels (1) to (5) in FIG. 5. FIG. 6 also illustrates photographs of each measurement points in the image of the five levels (1) to (5) together with the luminance measurement results. The graph is made by averaging measurement values on a plurality of points as illustrated in the photographs because luminance values vary depending on the points of the valley and ridge portions even in the same image. As can be seen from the graph of FIG. 6, images of level (1) to (3) show the relation of A/B<1 because the luminance of the toner image in a ridge portion is lower than that in a valley portion. The image of level (4) shows the relation of A/B=1 because the luminance of the toner image in the valley portion nearly equals to that in the ridge portion. The image of level (5) shows the relation of A/B>1 because the luminance of the toner image in the ridge portion is higher than that in the valley portion.

From the results illustrated in FIG. 6, it can be determined that decreasing of the DC component of the secondary transfer bias has an effect of decreasing the transfer rate B for ridge portions; while an increase in the amplitude of the AC component of the secondary transfer bias has an effect of increasing the transfer rate A for valley portions. Based on the results, the secondary transfer bias application condition is controlled in such a manner that the larger a user adjusts the "valley portion image density/ridge portion image density" (corresponds to a ratio of A/B), the smaller the DC component of the secondary transfer bias and the larger the amplitude of the AC component of the secondary transfer bias. This control allowed forming an image having the relation of A/B>1 as well as an image having the relation of A/B<1 and an image having the relation of A/B=1.

In addition, the same effect as describe above was achieved when the secondary transfer bias roller 60 was constant-current controlled as described in the following cases (1) to (5). In order to handle various kinds of sheets, constant-current control is preferable than constant-voltage control.

(1) When a user sets the "valley portion image density/ridge portion image density" to the lowest ratio, secondary transfer bias having the DC component that is set to −30 μA, and the AC component that is set to 0 μA, i.e., the secondary transfer bias is a direct-current, is applied to the secondary transfer bias roller 60.

(2) When a user sets the "valley portion image density/ridge portion image density" to the second lowest ratio, secondary transfer bias having the DC component that is set to −6 μA, and the AC component that is a sine wave having a frequency of 1 kHz and set to 20 μA is applied to the secondary transfer bias roller 60.

(3) When a user sets the "valley portion image density/ridge portion image density" to the third lowest ratio, secondary transfer bias having the DC component that is set to −3 μA, and the AC component that is a sine wave having a frequency of 1 kHz and set to 40 μA is applied to the secondary transfer bias roller 60.

(4) When a user sets the "valley portion image density/ridge portion image density" to the fourth lowest ratio, secondary transfer bias having the DC component that is set to −1 μA, and the AC component that is a sine wave having a frequency of 1 kHz and set to 40 μA is applied to the secondary transfer bias roller 60.

(5) When a user sets the "valley portion image density/ridge portion image density" to the highest ratio, secondary transfer bias having the DC component that is set to 0 μA, and the AC component that is a sine wave having a frequency of 1 kHz and set to 40 μA is applied to the secondary transfer bias roller 60.

When a sheet excluding the sheets described above (heavy paper, colored paper, and special paper), such as regular paper, recycled paper, and coated paper, were selected, the selection of the "valley portion image density" was disabled because such selected paper has few ridges and valleys. Secondary transfer bias having the DC component that was set to −3000 V (in constant-current control, the DC component is set to −30 μA) was applied as usual.

Next, the description is made when a detection unit that detects surface smoothness of a sheet is provided. The detection unit that detects the smoothness can include, for example, a light emitting sensor that emits light toward a transfer target surface of the sheet P, and a light receiving sensor that receives light that is emitted from the light emitting sensor and reflected by the transfer target surface of the sheet P. In the detection unit thus structured, it can be determined that when a received light amount is small, smoothness is low; while when a received light amount is large, smoothness is high. A detection unit 70, an example of the detection unit, can be disposed upstream in a sheet carrying direction of the secondary transfer bias roller 60 as exemplarily illustrated in FIG. 2.

When the detection unit 70 is provided, a user can select, regardless of the kind of the sheet, any of the five levels indicating the "valley portion image density/ridge portion image density" corresponding to a ratio of A/B in the basic setting screen of the print setting screen displayed on the display section provided on the operation panel of the image forming apparatus 10, or the display section of the host computer.

Figure 7:
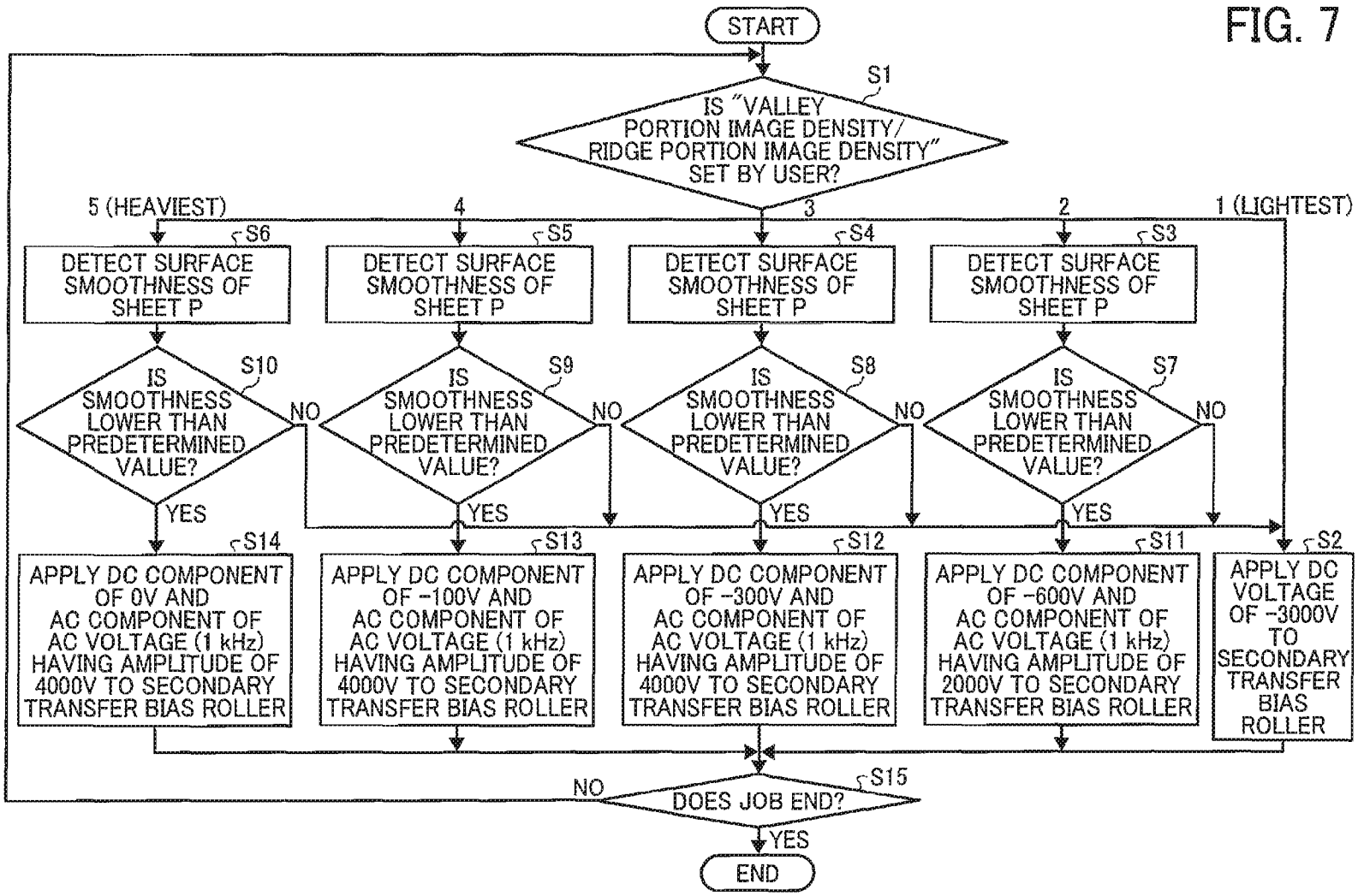
FIG. 7 is a flowchart illustrating an example of secondary transfer bias control when a detection unit is provided.

FIG. 7 is a flowchart illustrating an example of secondary transfer bias control when the detection unit 70 is provided. Upon starting of a print job, a selection result of the five levels indicating the "valley portion image density/ridge portion image density" is determined (S1). If the lowest (the lightest) level of the "valley portion image density/ridge portion image density" is selected, the control unit controls in such a manner that secondary transfer bias having the DC component set to −3000 V, i.e., the secondary transfer bias is a direct-current voltage, is applied to the secondary transfer bias roller 60 (S2). If the second to fourth lower levels, and the highest level of the "valley portion image density/ridge portion image density" are set, the detection unit 70 detects smoothness of a sheet (S3 to S6).

If the smoothness detected by the detection unit 70 of the sheet is equal to or higher than a predetermined value (No at each of S7 to S10), it is not necessary to add the AC component for saving a toner adhesion amount because the sheet has few ridges and valleys on the surface. Accordingly, the control unit controls in such a manner that secondary transfer bias having the DC component set to −3000 V, i.e., meaning the secondary transfer bias being a direct-current voltage, is applied to the secondary transfer bias roller 60 (S2) in the same manner as the case when the lowest (the lightest) level of the "valley portion image density/ridge portion image density" is selected. As a result, toner can be prevented from being scattered during the secondary transfer, whereby image quality can be improved.

If the smoothness detected by the detection unit 70 of the sheet is equal to or lower than the predetermined value (Yes at each of S7 to S10), the control unit controls in such a manner that secondary transfer bias determined according to the user selected level of the "valley portion image density/ridge portion image density" is applied to the secondary transfer bias roller 60 in the same manner as the cases (2) to (5) (S11 to S14). S1 to S14 are repeated until a job-end step at which the print job ends (S15).

The controlling of the secondary transfer bias, applied to the secondary transfer bias roller 60 by detecting a surface property (smoothness) of the sheet P as illustrated in the flowchart of FIG. 7, saved selecting the kind of sheets piece by piece and also increased productivity.

The constant-current control is also preferable for handling various kinds of sheets in the case when the detection unit 70 is provided, as the same in the case when no detection unit is provided.

According to the embodiment described above, a user can adjust a ratio of A/B according to texture that the user intends to obtain, where A is defined as a transfer rate [%] from the intermediate transfer belt 22 serving as an image carrier to a valley portion of the sheet P serving as a transfer target; while B is defined as a transfer rate [%] from the intermediate transfer belt 22 to a ridge portion of the sheet P. Once a user adjusts the ratio of A/B according to the user's intention, a transfer condition of the transfer unit, including the secondary transfer bias roller 60 that transfers a toner image to the sheet P from the intermediate transfer belt 22, is controlled based on the adjusted ratio of A/B. The control of the transfer condition enables the toner image on the intermediate transfer belt 22 to be transferred on the sheet P by changing the ratio of the transfer rates of the valley and ridge portions of the sheet P so as to achieve texture that the user intends to obtain. Consequently, images can be formed on the sheet P having low surface smoothness without loosing texture that the user intends to obtain.

In addition, according to the embodiment, the image forming apparatus further includes a transfer bias application unit (secondary transfer bias power source) that applies transfer bias, in which an AC component (alternating-current component) superimposed with a DC component (direct-current component) is applied onto the secondary transfer bias roller 60. The transfer bias application unit is controlled in such a manner that the larger the ratio of A/B set by a user is, the smaller the direct-current component of the transfer bias and the larger the amplitude of the alternating-current component of the transfer bias. The control of the DC component and the AC component of the transfer bias enables transfer rates of the valley and ridge portions of the sheet to be individually and properly controlled. As a result, images can be reliably formed on the sheet P having low surface smoothness according to the ratio of A/B adjusted by a user.

In addition, according to the embodiment, the ratio of A/B can be adjusted to a plurality of levels including at least one range satisfying A/B>1, a range satisfying A/B=1, and at least one range satisfying A/B<1, whereby a user can easily adjust the ratio of A/B.

Furthermore, according to the embodiment including the detection unit 70 that detects surface smoothness of the sheet P, the kinds of sheets having different surface smoothness (degree of ridges and valleys) can be determined based on the detection result of the detection unit 70. Accordingly, a user does not need to select the kinds of sheets; and a transfer condition (secondary transfer bias) can be properly controlled according to surface smoothness of a sheet. In addition, a user can save selecting the kinds of sheets piece by piece, whereby productivity can be increased.

Furthermore, according to the embodiment, when the surface smoothness detected by the detection unit 70 of the sheet P is equal to or greater than a predetermined value, it is not necessary to add the AC component for saving a toner adhesion amount because the sheet has few ridges and valleys on the surface. In this case, the control unit controls in such a manner that transfer bias having only a direct-current component is applied to the secondary transfer bias roller 60 regardless of a ratio of A/B adjusted by a user. As a result, toner can be prevented from being scattered during the secondary transfer, whereby image quality can be improved.

In the embodiment, the "valley portion image density/ridge portion image density" corresponding to a ratio of A/B can be adjusted (selected and set) to five levels. However, the number of adjustable levels of the "valley portion image density/ridge portion image density" is not limited to five. For example, the present invention can be applied to a case of three adjustable levels (selected and set to three levels): a range satisfying A/B>1; a range satisfying A/B=1; and a range satisfying A/B<1 in the same manner as the case of the five levels.

In the embodiment, a control target is the transfer bias (the secondary transfer bias). However, besides the transfer bias (the secondary transfer bias), the present invention can be applied to other transfer conditions that are controlled according to the "valley portion image density/ridge portion image density" corresponding to a ratio of A/B adjusted by a user in the same manner as the case of the transfer bias. Any control targets may be applicable as long as they can change individually the transfer rates of the valley and ridge portions of a sheet.

In the embodiment, the transfer condition when a toner image is transferred to a sheet from the intermediate transfer belt 22 is controlled. However, the present invention can be applied, in the same manner of the embodiment, to a case of controlling a transfer condition when a toner image is directly transferred to the sheet P from the photosensitive element 21 without being transferred to the intermediate transfer belt 22.

According to the present invention, a user can adjust a ratio of A/B according to texture that the user intends to obtain, where A is defined as a transfer rate [%] from an image carrier to a valley portion of a transfer target; while B is defined as a transfer rate [%] from the image carrier to a ridge portion of the transfer target. For example, when a user intends to obtain texture of an image drawn with colored pencils or printed by block print, the user adjust the ratio of A/B to small so as to reduce a toner adhesion amount on the valley portion. For another example, when a user intends to reduce an effect of texture of a transfer target for printing characters and the like with high visibility, the user adjusts the ratio of A/B so as to equalize the toner adhesion amount on the ridge portion and the valley portion. Once a user adjusts the ratio of A/B according to the user's intention, a transfer condition of a transfer unit that transfers a toner image to the transfer target from the image carrier is controlled based on the adjusted ratio of A/B. The control of the transfer condition enables the toner image on the image carrier to be transferred on the transfer target by changing the ratio of the transfer rates of the valley and ridge portions of the transfer target so as to achieve texture that the user intends to obtain. Consequently, the present invention exhibits an effect of forming images on a transfer target having low surface smoothness without loosing texture that a user intends to obtain.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:

an image carrier;

a transfer [unit] *roller* that transfers a toner image on the image carrier to a sheet;

a [transfer bias application unit] *power source* that applies, to the transfer [unit] *roller*, a transfer bias in which an alternating-current component is superimposed on a direct-current component;

[an adjusting unit] *input device hardware* that [adjusts a level of the alternating-current component and a level of the direct-current component] *a user operates only when a predetermined kind of the sheet having ridges and valleys on a surface thereof is selected to input a ratio between a selectable image density in a valley portion of the sheet and a selectable image density in a ridge portion of the sheet*; and

[a] *processing circuitry configured to adjust a level of the alternating-current component and a level of the direct-current component based on the ratio between the selectable image density in the valley portion of the sheet and the selectable image density in the ridge portion of the sheet that is input by the input device hardware, and to* control [unit that controls] the [transfer bias application unit] *power source* to apply the transfer bias [based on] *according to* the level of the alternating-current component and the level of the direct-current component *that is* adjusted *based on the ratio between the selectable image density in the valley portion of the sheet and the selectable image density in the ridge portion of the sheet that is input* by the [adjusting unit] *input device hardware,*

*wherein a value of the level of the alternating-current component increases and a value of the level of the direct-current component decreases as the ratio between the selectable image density in the valley portion of the sheet and the selectable image density in the ridge portion of the sheet that is input by the input device hardware increases, the value of the level of the alternating-current component being greater than zero when the ratio between the selectable image density in the valley portion of the sheet and the selectable image density in the ridge portion of the sheet that is input by the input device hardware is greater than or equal to 1.*

2. The image forming apparatus according to claim 1, [further comprising a selection unit that selects a] *wherein the input device hardware allows selection of the predetermined* kind of the sheet, [wherein the adjusting unit allows to adjust the level of the alternating-current component and the level of the direct-current component] *and the input device hardware allows input of the ratio* only when the sheet selected by the [selection unit] *input device hardware* is a predetermined sheet.

[3. The image forming apparatus according to claim 2, wherein the predetermined sheet is a sheet having ridges and valleys on a surface thereof.]

4. The image forming apparatus according to claim 2, wherein, when the sheet selected by the [selection unit] *input device hardware* is a sheet other than the predetermined sheet, the [control unit controls] *processing circuitry is configured to control* the [transfer bias application unit] *power source* to apply the transfer bias having only the direct-current component.

5. The image forming apparatus according to claim 2, wherein the [selection unit] *input device hardware* includes an operation panel.

6. The image forming apparatus according to claim 1, wherein the [adjusting unit] *input device hardware* includes an operation panel.

7. The image forming apparatus according to claim 1, wherein the image carrier is an intermediate transfer belt.

8. The image forming apparatus according to claim 1, [wherein the transfer unit includes] *further comprising* a transfer [member configured] *conveyor* to contact with the image carrier via the sheet *so that the transfer roller transfers the toner image on the image carrier to the sheet*.

9. The image forming apparatus according to claim 8, wherein the transfer [member] *conveyor* is a transfer conveying belt.

10. An image forming apparatus, comprising:

an image carrier;

a transfer [unit] *roller* that transfers a toner image on the image carrier to a sheet having ridges and valleys on a surface thereof;

a [transfer bias application unit] *power source* that applies, to the transfer [unit] *roller*, a transfer bias in which an alternating-current component is superimposed on a direct-current component;

[an adjusting unit] *input device hardware* that [adjusts a level of the alternating-current component and a level of the direct-current component] *a user operates only when a predetermined kind of the sheet having ridges and valleys on a surface thereof is selected to input a ratio between a selectable image density in a valley portion of the sheet and a selectable image density in a ridge portion of the sheet*; and

[a] *processing circuitry configured to adjust a level of the alternating-current component and a level of the direct-current component based on the ratio between the selectable image density in the valley portion of the sheet and the selectable image density in the ridge portion of the sheet that is input by the input device*

*hardware, and to* control [unit that controls] the transfer bias applied to the transfer [unit based on] *roller according to* the level of the alternating-current component and the level of the direct-current component *that is* adjusted *based on the ratio between the selectable image density in the valley portion of the sheet and the selectable image density in the ridge portion of the sheet that is input* by the [adjusting unit] *input device hardware,*

*wherein a value of the level of the alternating-current component increases and a value of the level of the direct-current component decreases as the ratio between the selectable image density in the valley portion of the sheet and the selectable image density in the ridge portion of the sheet that is input by the input device hardware increases, the value of the level of the alternating-current component being greater than zero when the ratio between the selectable image density in the valley portion of the sheet and the selectable image density in the ridge portion of the sheet that is input by the input device hardware is greater than or equal to 1.*

11. An image forming apparatus, comprising:

an image carrier;

a transfer [unit] *roller* that transfers a toner image on the image carrier to a sheet;

a [transfer bias application unit] *power source* that applies a transfer bias to the transfer [unit] *roller*;

[a selecting unit] *input device hardware that a user operates only when a predetermined kind of the sheet having ridges and valleys on a surface thereof is selected* to [select the transfer bias from any one of a first direct-current voltage and a superimposed voltage in which an alternating-current voltage is superimposed on a second direct-current voltage] *input a a ratio between a selectable image density in a valley portion of the sheet and a selectable image density in a ridge portion of the sheet*; and

[a] *processing circuitry configured to select the transfer bias from any one of a first direct-current voltage and a superimposed voltage in which an alternating-current voltage is superimposed on a second direct-current voltage based on the ratio between the selectable image density in the valley portion of the sheet and the selectable image density in the ridge portion of the sheet that is input by the input device hardware, and to* control [unit that controls] the transfer bias applied to the transfer [unit] *roller according to the transfer bias that is selected* based on [a selection result of] the [selecting unit] *ratio between the selectable image density in the valley portion of the sheet and the selectable image density in the ridge portion of the sheet that is input by the input device hardware*, wherein a level of the first direct-current voltage is greater than a level of the second direct-current voltage*, and*

*wherein a value of the level of the alternating-current voltage increases and a value of the level of the direct-current voltage decreases as the ratio between the selectable image density in the valley portion of the sheet and the selectable image density in the ridge portion of the sheet that is input by the input device hardware increases, the value of the level of the alternating-current voltage being greater than zero when the ratio between the selectable image density in the valley portion of the sheet and the selectable image density in the ridge portion of the sheet that is input by the input device hardware is greater than or equal to 1.*

12. The image forming apparatus according to claim 11, [wherein the transfer unit includes] *further comprising* a transfer [member] *conveyor* that forms a transfer nip between the image carrier and the transfer [member] *conveyor*, and wherein the toner image on the image carrier is transferred to the sheet at the transfer nip.

13. The image forming apparatus according to claim 12, wherein the transfer [member] *conveyor* is a transfer conveying belt.

14. The image forming apparatus according to claim 11, wherein the image carrier is an intermediate transfer belt.

15. An image forming apparatus, comprising:

an image carrier;

a transfer [unit] *roller* that transfers a toner image on the image carrier to a sheet;

a [transfer bias application unit] *power source* that applies a transfer bias to the transfer [unit] *roller*;

[a selecting unit to select the transfer bias from any one of a first direct current and a superimposed current in which an alternating current is superimposed on a second direct-current voltage] *input device hardware that a user operates only when a predetermined kind of the sheet having ridges and valleys on a surface thereof is selected to input a ratio between a selectable image density in a valley portion of the sheet and a selectable image density in a ridge portion of the sheet*; and

[a] *processing circuitry configured to select the transfer bias from any one of a first direct current and a superimposed current in which an alternating current is superimposed on a second direct current based on the ratio between the selectable image density in the valley portion of the sheet and the selectable image density in the ridge portion of the sheet that is input by the input device hardware, and to* control [unit that controls] the transfer bias applied to the transfer [unit] *roller according to the transfer bias that is selected* based on [a selection result of] the [selecting unit] *ratio between the selectable image density in the valley portion of the sheet and the selectable image density in the ridge portion of the sheet that is input by the input device hardware*, wherein a level of the first direct current is greater than a level of the second direct current*, and*

*wherein a value of a level of the alternating current increases and a value of a level of the direct current decreases as the ratio between the selectable image density in the valley portion of the sheet and the selectable image density in the ridge portion of the sheet that is input by the input device hardware increases, the value of the level of the alternating current being greater than zero when the ratio between the selectable image density in the valley portion of the sheet and the selectable image density in the ridge portion of the sheet that is input by the input device hardware is greater than or equal to 1.*

16. The image forming apparatus according to claim 15, [wherein the transfer unit includes] *further comprising* a transfer [member] *conveyor* that forms a transfer nip between the image carrier and the transfer [member] *conveyor*, and wherein the toner image on the image carrier is transferred to the sheet at the transfer nip.

17. The image forming apparatus according to claim 16, wherein the transfer [member] *conveyor* is a transfer conveying belt.

18. The image forming apparatus according to claim 15, wherein the image carrier is an intermediate transfer belt.

*19. An image transferring apparatus, comprising:*

*a belt-shaped image carrier including an elastic layer;*

*a transfer roller to transfer a toner image on the image carrier to a sheet;*

*a power source to apply, to the transfer roller, a transfer bias in which an alternating-current component is superimposed on a direct-current component; and*

*input device hardware that a user operates only when a predetermined kind of the sheet having ridges and valleys on a surface thereof is selected to input a selection of a ratio between a selectable image density in a valley portion of the sheet and a selectable image density in a ridge portion of the sheet, and the transfer bias is adjusted based on the ratio between the selectable image density in the valley portion of the sheet and the selectable image density in the ridge portion of the sheet that is input by the input device hardware,*

*wherein a value of a level of the alternating-current component increases and a value of a level of the direct-current component decreases as the ratio between the selectable image density in the valley portion of the sheet and the selectable image density in the ridge portion of the sheet that is input by the input device hardware increases, the value of the level of the alternating-current component being greater than zero when the ratio between the selectable image density in the valley portion of the sheet and the selectable image density in the ridge portion of the sheet that is input by the input device hardware is greater than or equal to 1.*

*20. The image transferring apparatus according to claim 19, wherein the image carrier includes a resin layer on which the elastic layer is formed.*

*21. The image transferring apparatus according to claim 20, wherein the image carrier includes a coated layer formed on the elastic layer.*

*22. The image transferring apparatus according to claim 21, wherein the coated layer contains fluorine components.*

*23. The image transferring apparatus according to claim 19, further comprising:*

*processing circuitry configured to adjust the transfer bias based on the ratio between the selectable image density in the valley portion of the sheet and the selectable image density in the ridge portion of the sheet that is input by the input device hardware, and to control the power source to apply the transfer bias according to the transfer bias that is adjusted based on the ratio between the selectable image density in the valley portion of the sheet and the selectable image density in the ridge portion of the sheet that is input by the input device hardware, wherein*

*the processing circuitry is configured to adjust a level of the direct-current component.*

*24. The image transferring apparatus according to claim 23, wherein the processing circuitry is configured to adjust the transfer bias such that a level of the alternating-current component increases as the level of the direct-current component decreases.*

*25. The image transferring apparatus according to claim 23, wherein the input device hardware includes an operation panel.*

*26. The image transferring apparatus according to claim 19, wherein*

*the input device hardware allows selection of the predetermined kind of the sheet, and*

*when the sheet selected by the input device hardware is a sheet other than the predetermined sheet, the power source applies the transfer bias having only the direct-current component.*

* * * * *